(12) United States Patent
Kuo (10) Patent No.: US 7,364,109 B2
(45) Date of Patent: Apr. 29, 2008

(54) CABLE REEL

(75) Inventor: Chin-Chang Kuo, Shu Lin (TW)

(73) Assignee: First Class Electrical Co., Ltd., Taipei Hsien (TW)

( * ) Notice: Subject to any disclaimer, the term of this patent is extended or adjusted under 35 U.S.C. 154(b) by 0 days.

(21) Appl. No.: 10/890,137

(22) Filed: Jul. 14, 2004

(65) Prior Publication Data

US 2006/0011763 A1     Jan. 19, 2006

(51) Int. Cl.
    *B65H 75/48*     (2006.01)
(52) U.S. Cl. ............... 242/373; 242/378; 242/378.1; 242/385.1
(58) Field of Classification Search ............... 242/378, 242/378.1, 378.2, 378.3, 385.1, 385.3, 373
See application file for complete search history.

(56) References Cited

U.S. PATENT DOCUMENTS

| | | | | |
|---|---|---|---|---|
| 4,472,010 A | * | 9/1984 | Parnello | |
| 5,094,396 A | * | 3/1992 | Burke | 242/378.2 |
| 5,289,987 A | * | 3/1994 | Collins et al. | 242/385.3 |
| 6,019,304 A | * | 2/2000 | Skowronski et al. | 242/373 |
| 6,293,485 B1 | * | 9/2001 | Hollowed | 242/385.3 |
| 6,375,109 B1 | * | 4/2002 | Liao | 242/378 |
| 6,446,898 B1 | * | 9/2002 | Hwang | 242/378.1 |
| 6,834,820 B2 | * | 12/2004 | Wei | 242/378 |

* cited by examiner

*Primary Examiner*—William A Rivera
(74) *Attorney, Agent, or Firm*—Rosenberg, Klein & Lee (57) ABSTRACT

The present invention discloses a cable reel, which comprises a casing, a movable latch member pivotally coupled into the casing, a protrusion disposed at one end of the latch member, a turntable disposed under the latch member and pivotally coupled into the casing, a volute spring disposed on a turntable, a cable disposed in the in the turntable, and an adapter can be connected to one end or both ends of the cable. Further, the turntable has a groove, and an inclined guide groove and an arc indented groove are disposed proximate to the groove such that the protrusion on the latch member in conjunction with the inclined guide groove and the arc indented groove can fix the cable at the currently located position and will not retract the cable into the cable reel when the cable is pulled. On the other hand, the cable is pulled gently again if it is necessary to rewind the cable. The protrusion of the latch member will then be released and the cable around the turntable will be retracted automatically to the turntable. The present invention not only is simple to use, but also is easy to carry.

4 Claims, 8 Drawing Sheets

CABLE REEL

BACKGROUND OF THE INVENTION

1. Field of the Invention

The present invention relates to a cable reel, more particularly to a cable reel assembly comprising a latch member, an inclined guide groove and an indented groove, such that the cable can be pulled to extend to a desired length and fixed temporarily at such position or the cable is pulled again to rewind the cable into the cable reel.

2. Description of the Related Art

In general, a cable coiler comes with a box member, and the box member has a rotary cable axle, and a transparent lid covers the top of the box member. Although the rotary axle of the cable coiler can be rotated to continuously coil the cable onto the cable axle for winding the cable. However, it is necessary to open the lid first before using the cable coiler, and the periphery of the cable axle is flat and straight and has no device for stopping the coil. If the number of coils of the cable is too large, then the cable will come off from the cable axle. Furthermore, the length of the cable extended from the cable coiler cannot be pulled according to the user's requirement and the cable cannot be fixed at the currently located position, which is very inconvenient for its use.

Figure 1:
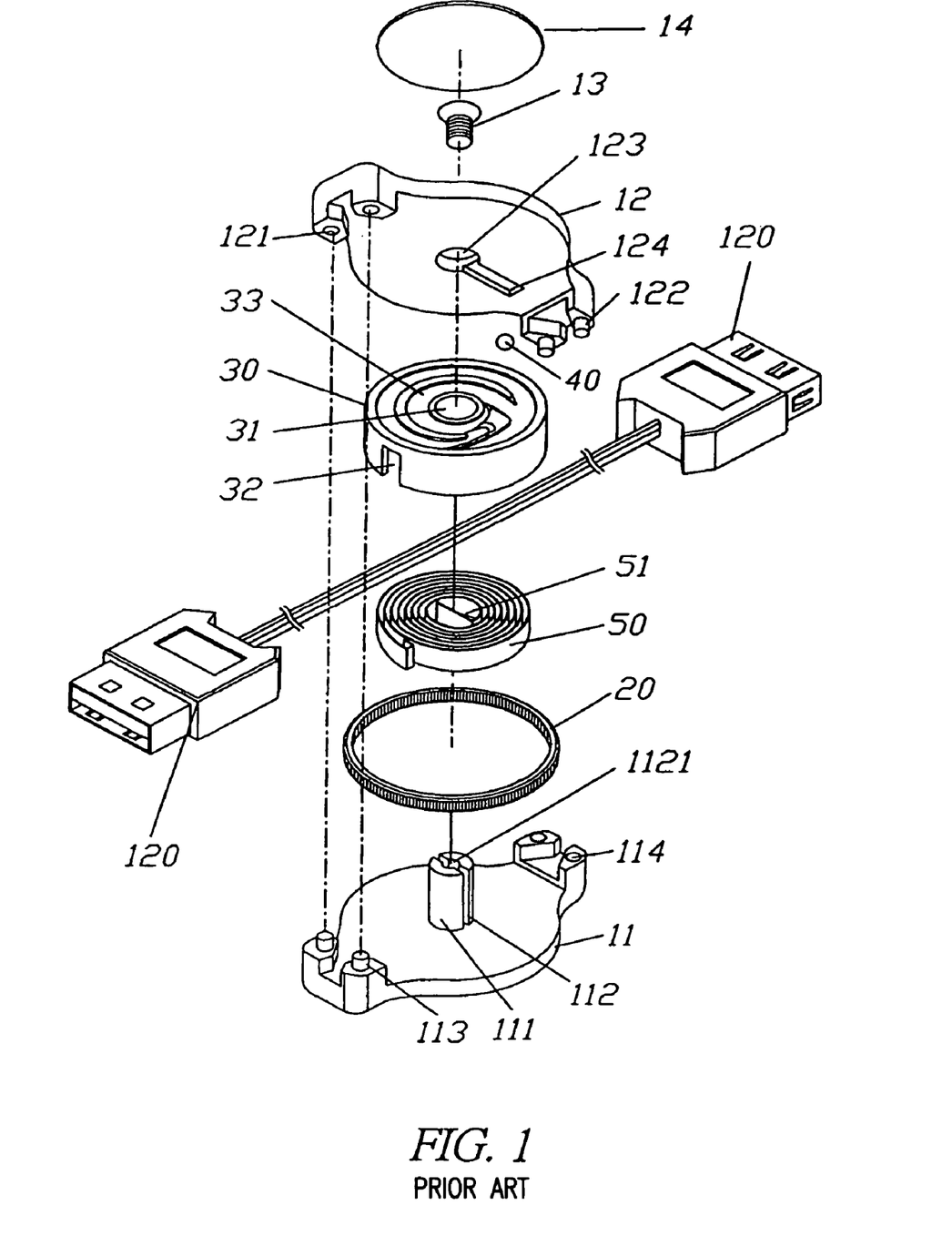
FIG. 1 is an exploded view of the cable reel according to a prior art.

To overcome the foregoing shortcomings, a Japanese Utility Model Registration No. 3093430 disclosed a cable coiler as shown in FIG. 1. The aforementioned patent relates to a cable coiler having a hanging device or an electric connector between both ends of the cable, and the cable coiler is comprised of a first casing and a second casing coupled with each other, and the first casing comprises an axle pole for pivotally coupling with a turntable, and the turntable comprises two cable grooves disposed on the circumferential plane of the turntable for installing a flat communication cable, a groove surrounded the surface of the turntable, an inclined guide groove disposed at the position adjacent to the groove, an arc indented groove surrounded the position proximate to the inclined guide groove and adjacent to an end section of the groove, and an open groove disposed on the axle pole for installing a volute spring. A stop groove is disposed on the internal side of the second casing, and a ball bearing is disposed on the surface of the turntable, such that when the first and second casings are latched, the ball bearing will be located exactly in the groove of the first casing at a position corresponding to the stop groove of second casing. Although the structure of this device can prevent rewinding the cable, yet the ball bearing is a spherical object which is not easy to control its rolling direction and position, even if there is a stop groove to limit the scope of its rolling. If there is a gap between the stop groove and the casing, then the ball bearing will fall out from the stop groove through the gap. Further, the ball bearing will fall off from the stop groove easily when the casing is disassembled and opened, and users may have difficulties to find the missing ball bearing.

SUMMARY OF THE INVENTION

To overcome the shortcomings of the abovementioned prior-art device, the inventor of this invention conducted extensive researches and experiments and finally invented the cable reel in accordance with the present invention.

It is therefore the primary objective of the present invention to provide a cable reel, which comprises a casing, a turntable pivotally coupled to the casing, a volute spring disposed in the turntable, a cable wound around the turntable, and an adapter connectable to one end or both ends of the cable. Further, the turntable comprises a groove, a latch member disposed in the groove and one end of the latch member being pivotally coupled to the casing, and an inclined groove and an arc indented groove being disposed proximate to the groove, so that the movement of the latch member in conjunction with the inclined groove and the arc indented groove pulls the cable out to a certain specific length and produces a latch effect on stopping the cable from retrogressing at various different stages and fixing the cable at the currently located position. On the other hand, the cable can be pulled further to release the latch effect, so that the cable will be rewound automatically. Such arrangement not only is simple to use, but also is very convenient for storing the cable.

Another objective of the present invention is to provide a cable reel, wherein the middle of a cable is fixed onto a turntable and both ends of the cable can be pulled out simultaneously to facilitate its use by users.

To make it easier for our examiner to understand the objective of the invention, its structure, innovative features, and performance, we use a preferred embodiment including but not limited to the attached drawings for the detailed description of the invention.

DETAILED DESCRIPTION OF THE PREFERRED EMBODIMENTS

Figure 2:
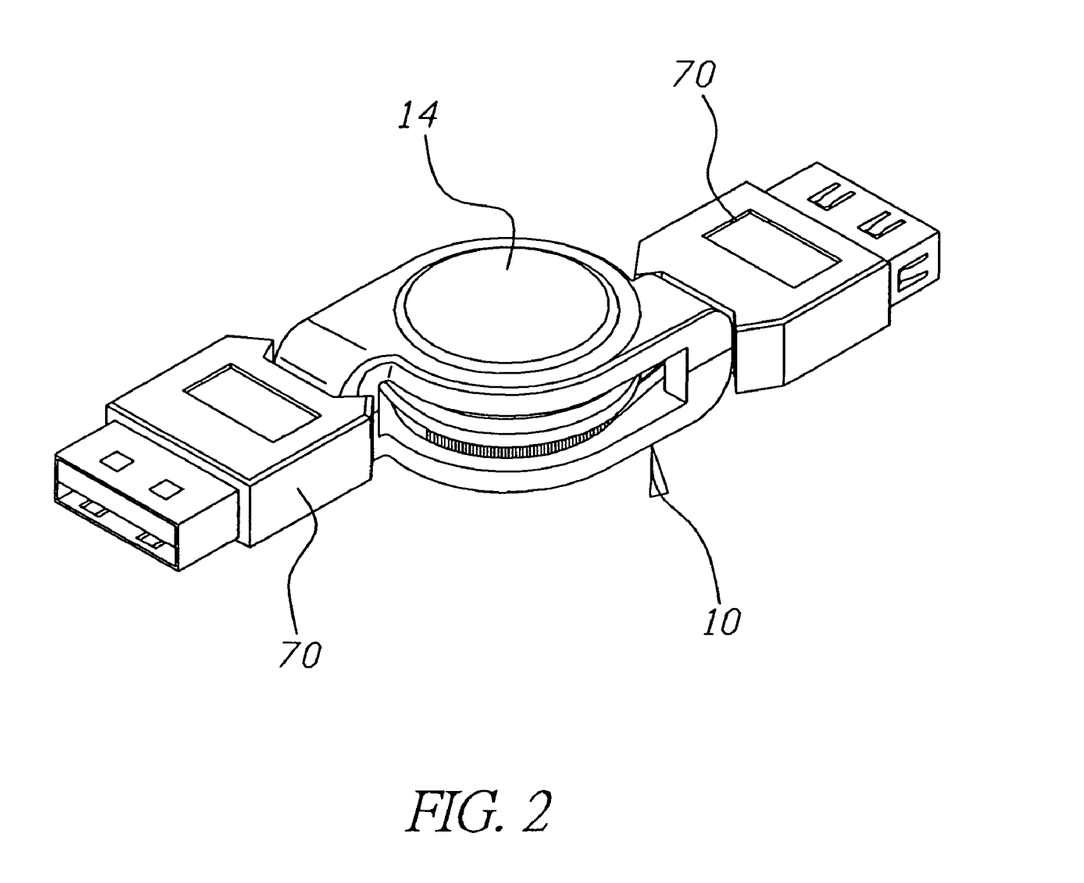
FIG. 2 is a perspective view of the cable reel according to the present invention.
Figure 3:
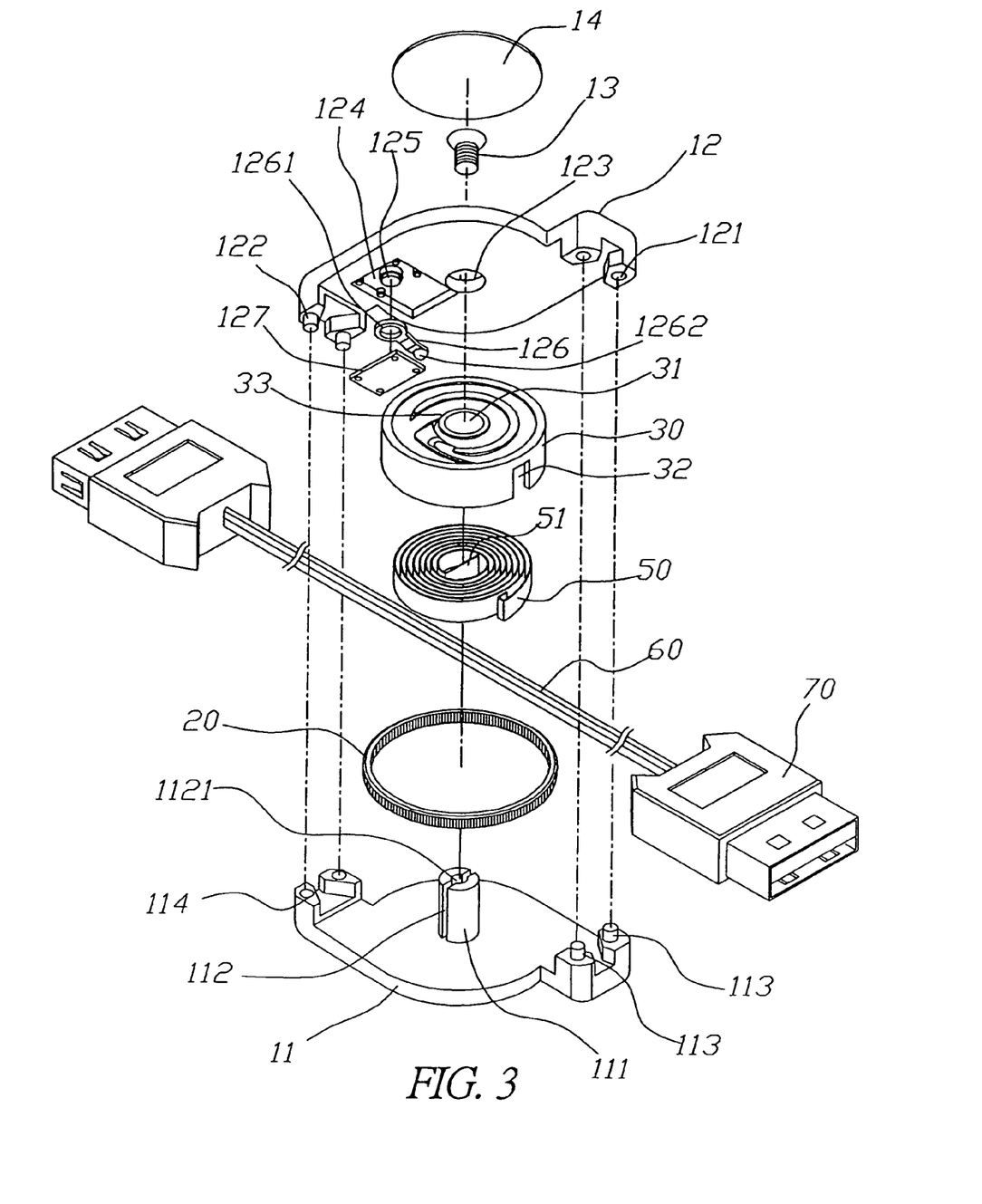
FIG. 3 is an exploded view of the cable reel according to the present invention.

Please refer to FIGS. 2 and 3 for the cable reel according to a preferred embodiment of the present invention. The cable reel comprises a casing 10, and the casing 10 comprises a first external casing 11 and a second external casing 12, wherein an axle pole 111 is protruded outward from one side of the first external casing 11, and the axle pole 111 has an open groove 112 extending along the axial direction and passing through the axle pole 111, and the open groove 112 has a screw hole 1121, and a protruded pole 113 and a groove 114 are disposed on both sides of the first external casing 11. Further, the second external casing 12 comprises a protruded pole 122 and a groove 121 disposed on both sides corresponding to the protruded pole 113 and the groove 114, so that the second external casing 12 is coupled with the first external casing 11 by latching the groove 121 and protruded pole 113 and the protruded pole 122 and the groove 114 respectively.

Figure 4:
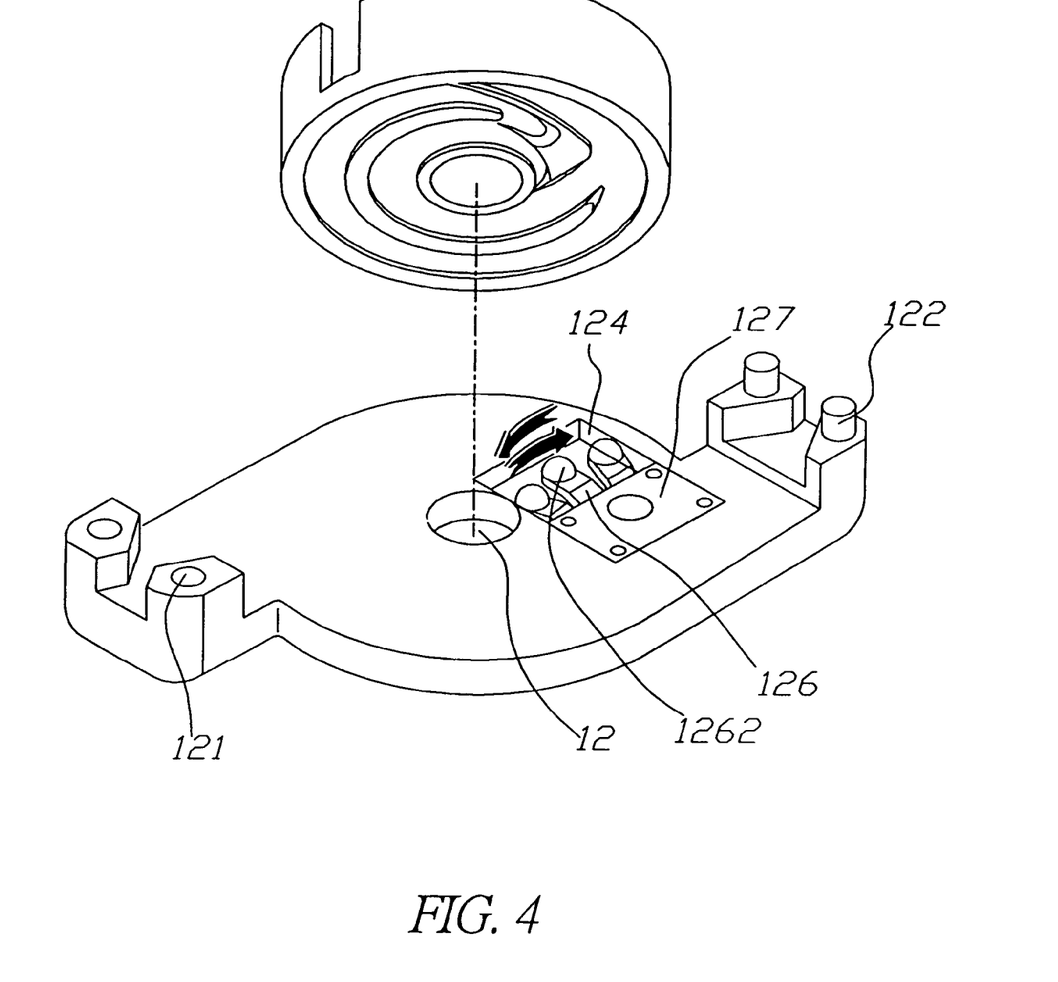
FIG. 4 is a perspective view of the disassembled parts of the second casing and the turntable according to the present invention.

Further, the second external casing 12 comprises a through hole 123 for installing and allowing a screw device 13 (such as a screw in this preferred embodiment) to pass through and the screw device 13 is coupled into the screw hole 1121 of the first external casing 11, such that the first and second external casings 11, 12 are coupled more securely. A lid 14 covers the top surface of the second external casing 12; a groove 124 is disposed on the second external casing 12; a pivotal rod 125 is disposed in the groove 124; and a latch member 126 is pivotally coupled to the pivotal rod 125. In this preferred embodiment, a rod member is used as the pivotal rod 125. The latch member 126 comprises a ring 1261 being disposed at one end and precisely embedded into the pivotal rod 125 and a protrusion 1262 disposed on another end and extended in the direction towards the first external casing 11, such that the latch member 126 uses the pivotal rod 125 as the center to swing back and forth along the groove 124 (as shown in FIG. 4), and a panel 127 covers the groove 124 and the panel 127 can precisely cover the end where the latch member 126 is pivotally coupled to the pivotal rod 125.

Figure 5:
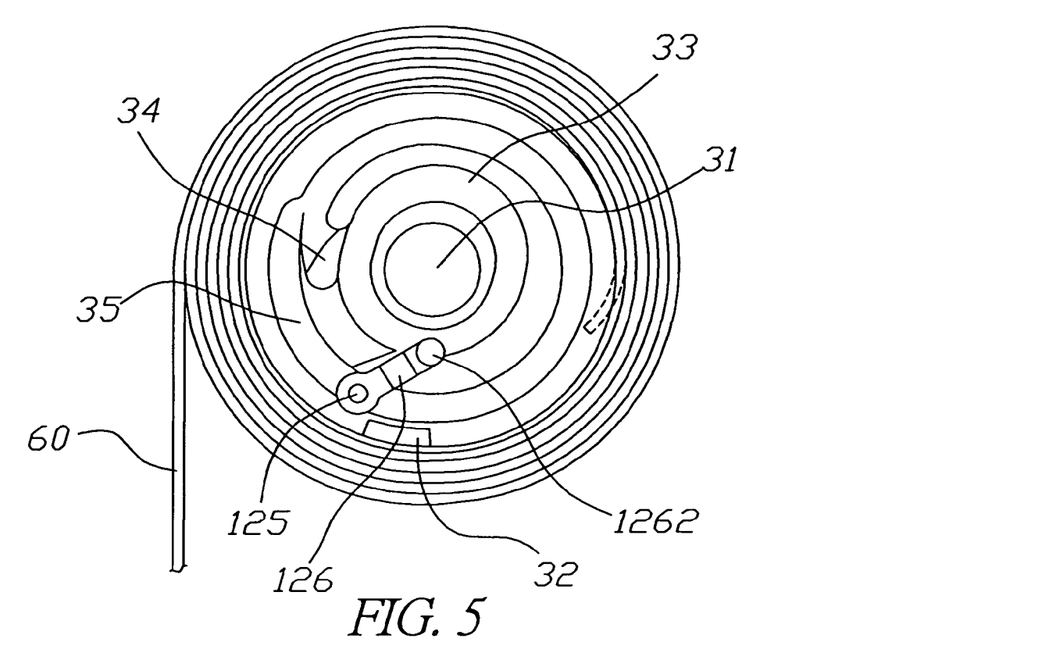
FIG. 5 is an illustrative view of the latch member being installed onto the surface of the turntable according to the present invention.

Further, the casing 10 comprises a retaining base 20 coupled to the periphery of the axle pole 111, and the retaining base 20 comprises a turntable 30 installed onto the axle pole 111. The turntable comprises a positioning hole 31 pivotally coupled onto the axle pole 111 of the first external casing 11, at least one cable groove 32 disposed on the periphery of the turntable 30, a groove 33 disposed around the surface of the turntable 30, an inclined guide groove 34 and an arc indented groove 35 are disposed proximate to the groove 33, wherein the arc indented groove 35 is coupled to an end of the inclined guide groove 33 (as shown in FIG. 5).

Further, the turntable 30 comprises a volute spring 50 therein and the volute spring 50 comprises a latch end 51 at the inner side of the volute spring 50, and the latch end 51 is coupled onto the open groove 112 of the axle pole 111 of the first external casing 11.

Further, the turntable 30 has a cable 60 at its periphery, and the cable 60 is passed all the way into the cable groove 32 of the turntable 30, such that both ends of the cable 60 can be pulled out. A retaining base 70 is disposed on both ends of the cable 60. The present embodiment adopts an USB slot base to facilitate users to carry.

Figure 6:
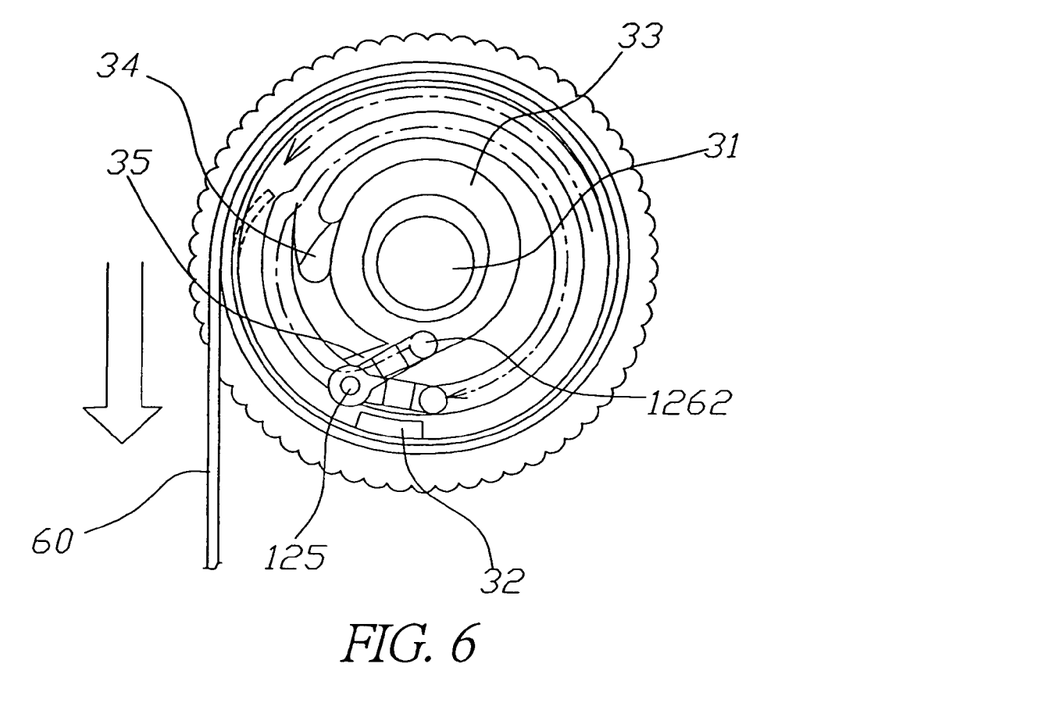
FIG. 6 is an illustrative view of the cable being pulled to rotate the turntable according to the present invention.
Figure 7:
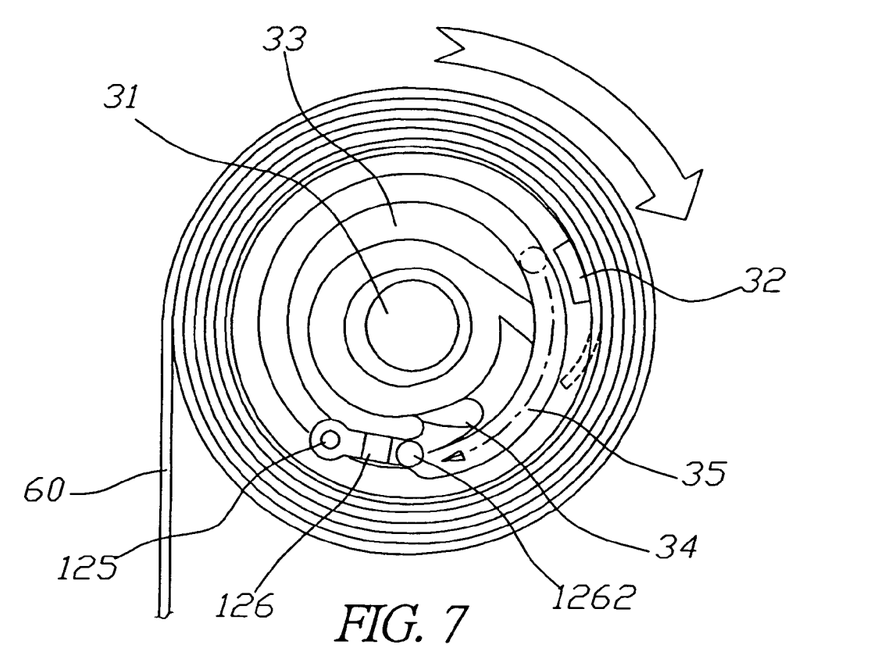
FIG. 7 is an illustrative view of the turntable being rotated by the deformation of the volute spring according to the present invention.
Figure 8:
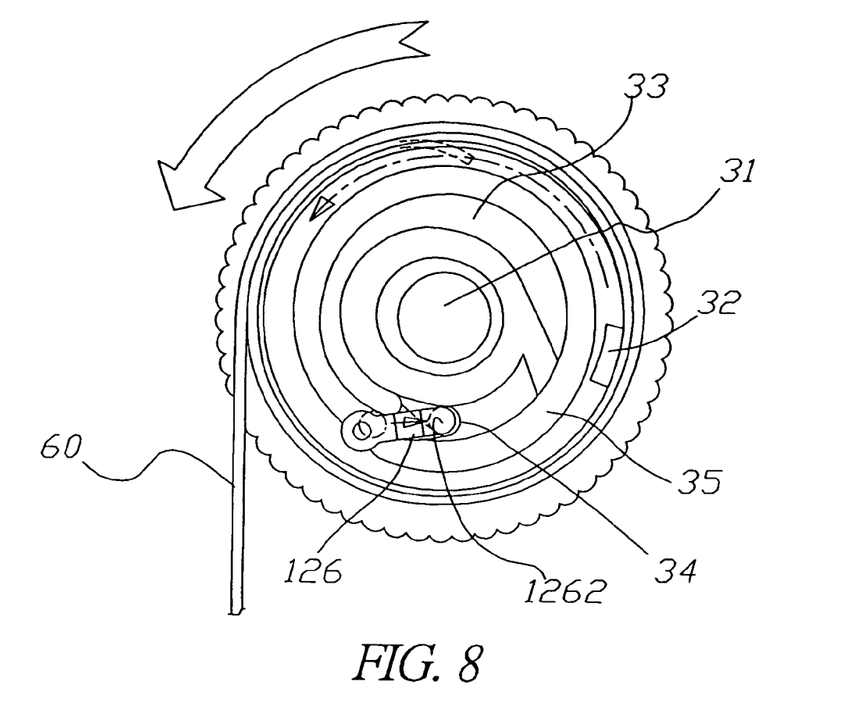
FIG. 8 is an illustrative view of the cable being pulled to a predetermined length to produce a latch effect according to the present invention.
Figure 9:
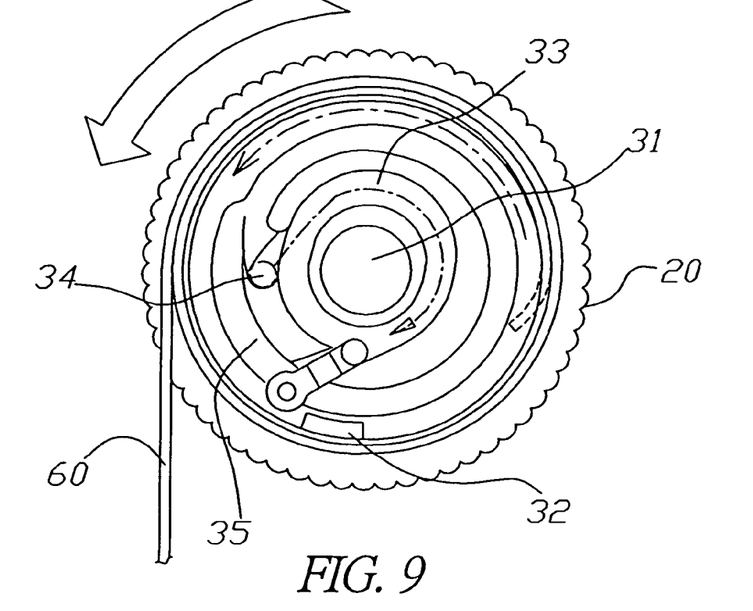
FIG. 9 is an illustrative view of the cable being pulled further to rotate the turntable according to the present invention.

Please refer to FIGS. 2 to 11. When a user pulls out the cable 60 and thus rotates the turntable counterclockwise, the protrusion 1262 of the latch member 126 of the groove 33 will move clockwise towards the arc indented groove 35 and remain at an appropriate required position as shown in FIG. 6. If the user wants to continue pulling the cable 60, it is necessary to release the cable 60 first, so that the protrusion 1262 of the latch member 126 will move clockwise due to the deformation produced by the volute spring 50 as shown in FIG. 8. When the protrusion 1262 moves towards the inclined guide groove 34 and is stopped by the inclined guide groove 34, a latch effect is generated to produce the positioning effect as shown in FIG. 7. Such arrangement allows users to pull the cable 60 out to the desired length. With the foregoing latch action, the cable 60 can be fixed at the currently located position, and thus the user can adjust the length of the cable intended to be pulled out. However, if the user wants to pull out the cable further, the user just needs to continue pulling the cable 60, and thus it will not generate a latch effect to the inclined guide groove 34, such that the turntable 30 continues turning counterclockwise, and the protrusion 1262 in the inclined guide groove 34 will move towards the groove 33 for a clockwise movement as shown in FIG. 9.

Figure 10:
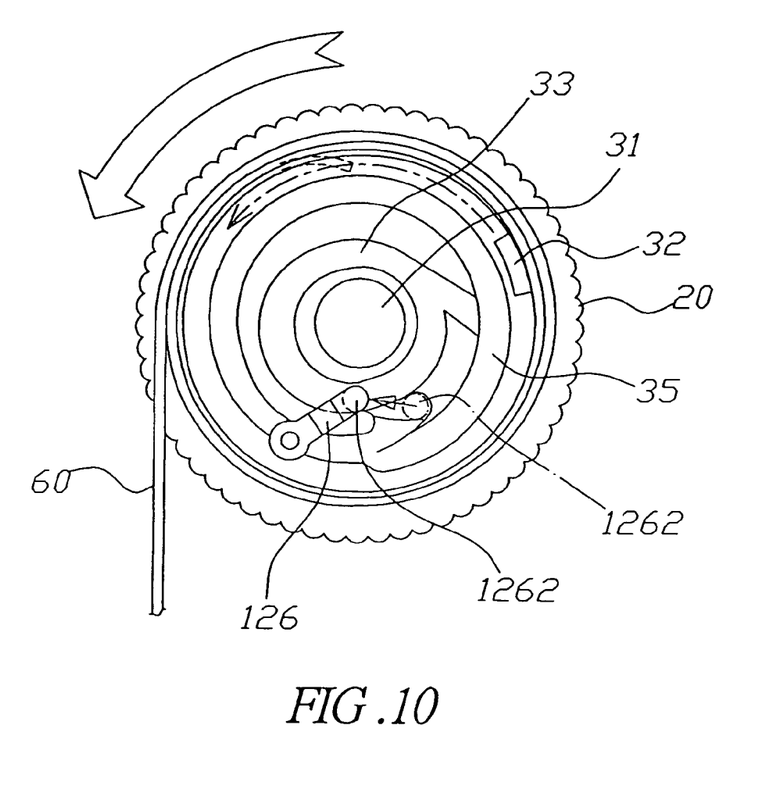
FIG. 10 is an illustrative view of the cable being retracted to rewind the turntable according to the present invention.
Figure 11:
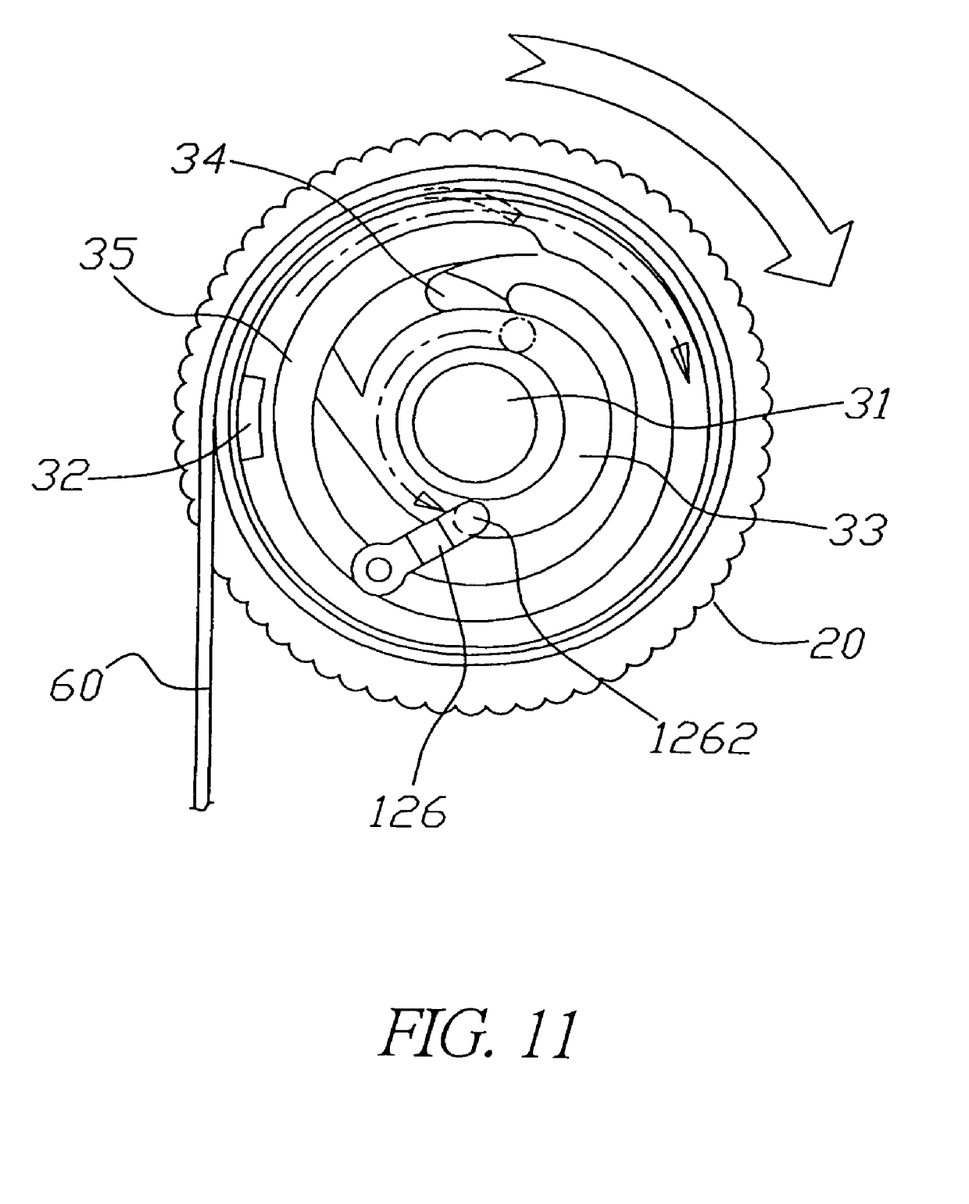
FIG. 11 is an illustrative view of the turntable continuing its rewinding according to the present invention.

Please refer to FIG. 10. If a user wants to rewind the cable 60, the user just needs to gently pull the cable 60 as to move the protrusion 1262 of the latch member 126 from the inclined guide groove 34 to the groove 33. The turntable 30 can be turned clockwise by the action of the volute spring 50 as to automatically rewind the cable 60 in a quick manner as shown in FIG. 11. Therefore, when the cable 60 is pulled to a certain specific length, a latch effect for a retrogressing action in different stages is produced to temporarily fix the cable 60 at the currently located position. The cable 60 can be pulled further to a certain specific length to automatically rewind the cable 60 and facilitate users to use the cable 60.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements.

What is claimed is:

1. A cable reel, comprising:

a casing, including a first external casing and a second external casing, said second external casing having a recess formed in a side thereof, a pivotal rod disposed in said recess, a movable latch member rotatably coupled to said pivotal rod, and a panel, said latch member having a ring disposed at one end thereof and a protrusion disposed on an opposing end, and extending therefrom toward said first external casing, said ring being disposed on said pivotal rod, and said panel covering a portion of said recess and overlaying said pivotal rod to capture said ring thereon;

a turntable, being rotatably coupled to said casing and having a groove surrounding the surface of said turntable and an inclined guide groove and an arc indented groove being disposed proximate to said groove, and said arc groove being coupled to an end of said inclined guide groove;

a volute spring, being accommodated in said turntable; and a cable, winding around the periphery of said turntable; thereby said latch member drives said protrusion to move in coordination with said inclined groove and said arc indented groove and fix said cable to its currently located position and prevent said cable from being retracted when said cable is pulled out, and said cable is pulled gently further to release said protrusion and automatically rewind said cable from the outside into said turntable.

2. The cable reel of claim 1, wherein said cable couples its middle section to said turntable.

3. The cable reel of claim 1, wherein said first external casing comprises an axle pole being outwardly protruded from one plane and rotatably coupled with said turntable, and said axle pole comprises an open groove being extended along its axial direction and passing through said axle pole for latching said volute spring.

4. The cable reel of claim 1, wherein said cable is coupled with an adapter.

* * * * *